United States Patent
Rautiainen et al.

(10) Patent No.: US 10,632,415 B2
(45) Date of Patent: Apr. 28, 2020

(54) ADSORPTION COLUMN SET FOR SEPARATING TWO OR MORE GASES OF A GAS MIXTURE FROM EACH OTHER USING PRESSURE SWING ADSORPTION

(71) Applicant: BIOGTS GREEN ENERGY COMPANY LIMITED, Mongkok (HK)

(72) Inventors: Mika Rautiainen, Leppävesi (FI); Annimari Lehtomäki, Petäjävesi (FI)

(73) Assignee: BIOGTS GREEN ENERGY COMPANY LIMITED, Mongkok, Kowloon (HK)

( * ) Notice: Subject to any disclaimer, the term of this patent is extended or adjusted under 35 U.S.C. 154(b) by 56 days.

(21) Appl. No.: 16/125,271

(22) Filed: Sep. 7, 2018

(65) Prior Publication Data

US 2019/0001254 A1 Jan. 3, 2019

Related U.S. Application Data

(63) Continuation-in-part of application No. PCT/FI2017/050153, filed on Mar. 7, 2017.

(30) Foreign Application Priority Data

Mar. 8, 2016 (FI) .................................... 20165192

(51) Int. Cl.
*B01D 53/047* (2006.01)
*B01D 53/04* (2006.01)

(52) U.S. Cl.
CPC ....... *B01D 53/047* (2013.01); *B01D 53/0407* (2013.01); *B01D 2256/10* (2013.01);
(Continued)

(58) Field of Classification Search
CPC .............. B01D 53/047; B01D 53/0407; B01D 2256/10; B01D 2256/12; B01D 2256/245;
(Continued)

(56) References Cited

U.S. PATENT DOCUMENTS 5,549,736 A 8/1996 Coffield et al.
5,827,354 A * 10/1998 Krabiell ............ B01D 53/0415
95/96
(Continued)

FOREIGN PATENT DOCUMENTS

| CN | 204469497 U | 7/2015 | |
|---|---|---|---|
| EP | 1245267 A1 * | 10/2002 | ......... B01D 53/0454 |
| WO | 2015002773 A1 | 1/2015 | |

OTHER PUBLICATIONS

Search Report of Finland Patent Application No. 20165192 dated Sep. 30, 2016.
International Preliminary Report on Patentability of PCT/FI2017/050153 dated Apr. 11, 2018.
International Search Report of PCT/FI2017/050153 dated Jun. 22, 2017.
Written Opinion of PCT/FI2017/050153 dated Jun. 21, 2017.

*Primary Examiner* — Frank M Lawrence, Jr.
(74) *Attorney, Agent, or Firm* — FisherBroyles, LLP; Robert Kinberg (57) ABSTRACT

The invention relates to a set for separating two or more gases from each other, including:
a first adsorption column set comprising at least two columns in series;
an optional number of additional column sets comprising additional columns;
connectors connecting each parallel additional column to the column;
auxiliary equipment feeding a gas mixture to the columns and additional columns jointly and discharging separated gases according to pressure swing adsorption.

18 Claims, 7 Drawing Sheets

(52) U.S. Cl.
CPC .... *B01D 2256/12* (2013.01); *B01D 2256/245* (2013.01); *B01D 2257/102* (2013.01); *B01D 2257/104* (2013.01); *B01D 2257/504* (2013.01); *B01D 2258/05* (2013.01); *B01D 2258/06* (2013.01); *B01D 2259/40003* (2013.01); *B01D 2259/404* (2013.01); *B01D 2259/4062* (2013.01); *B01D 2259/4068* (2013.01); *Y02C 10/08* (2013.01)

(58) Field of Classification Search
CPC ........ B01D 2257/102; B01D 2257/104; B01D 2257/504; B01D 2258/05; B01D 2258/06; B01D 2259/40003; B01D 2259/404; B01D 2259/4062; B01D 2259/4068; Y02C 10/08
USPC .................................................. 96/121, 131
See application file for complete search history.

(56) References Cited

U.S. PATENT DOCUMENTS

| | | | |
|---|---|---|---|
| 6,918,953 B2 * | 7/2005 | Lomax, Jr. | B01D 53/0446 96/130 |
| 7,763,102 B2 * | 7/2010 | Lomax, Jr. | B01D 53/0407 96/121 |
| 8,361,205 B2 | 1/2013 | Desai et al. | |
| 8,702,840 B1 * | 4/2014 | Friedman | B01D 53/053 95/19 |
| 9,724,636 B2 * | 8/2017 | Ericson | B01D 53/261 |
| 2003/0188635 A1 * | 10/2003 | Lomax, Jr. | B01D 53/0446 95/96 |
| 2006/0243133 A1 * | 11/2006 | Hart | B01D 53/047 95/26 |

* cited by examiner

ADSORPTION COLUMN SET FOR SEPARATING TWO OR MORE GASES OF A GAS MIXTURE FROM EACH OTHER USING PRESSURE SWING ADSORPTION

This application a Continuation-in-Part of International Patent Application No: PCT/FI2017/050153 filed Mar. 7, 2017, which claims benefit of Finland Patent Application No. 20165192, both of which are incorporated by reference in their entirety.

TECHNICAL FIELD

The invention relates to an adsorption column set for separating two or more gases of a gas mixture from each other using pressure swing adsorption, the adsorption column set including:
- a first adsorption column set comprising at least two adsorption columns connected in series and including an adsorption medium for adsorbing a first gas by the action of pressure, with each adsorption column including a feed connection and a discharge connection,
- an optional number of additional adsorption column sets comprising an equal number of additional adsorption columns as there are adsorption columns in the first adsorption column set to form one or more additional adsorption columns alongside with the equivalent adsorption column of the first adsorption column set,
- auxiliary equipment supported in the vicinity of said adsorption columns for feeding a gas mixture to the adsorption columns and for discharging separated gases according to pressure swing adsorption, comprising operation valves of each adsorption column for restricting the flow of the gas mixture and separated gases.

BACKGROUND OF THE INVENTION

The equipment proposed in publication CN201470294 U for producing nitrogen utilising pressure swing adsorption is known in the prior art. In pressure swing adsorption, adsorption of gas in an adsorption medium is effected by increasing pressure, whereupon gas to be separated adsorbs in the composition of the adsorption medium. Gas adsorbed in the adsorption medium can be separated from the adsorption medium by decreasing the pressure of the adsorption column and by applying a vacuum in the adsorption column, whereupon the adsorption medium is simultaneously regenerated. The technology based on pressure swing adsorption is generally known as PSA technology (Pressure Swing Adsorption).

Processes based on the PSA technology generally use cyclic pressurisation, wherein several adsorption columns connected in series are run in different stages of pressure swing adsorption. When the gas to be separated has been adsorbed in the adsorption medium, it is possible, under high pressure, to start discharging unadsorbed gas from the adsorption column simultaneously feeding a new gas mixture to the adsorption column, until the carbon molecular sieve becomes saturated by adsorbed gas or gases. After this, the flow of the gas product is stopped by closing the valve to the gas product line and the venting of the adsorption column is started into the following columns connected in series. Finally, the pressure of the adsorption column decreases to the level of air pressure, but a significant part of the adsorbed gas is adsorbed in the adsorption medium. With a vacuum, adsorbed gas can be made to desorb from the adsorption medium and thus recovered, at the same time regenerating the adsorption medium. The same vacuum is also used to remove moisture from the adsorption medium.

However, the prior art cyclic feeding described above between adsorption columns requires a notable number of operation valves and a control unit in order that the feeding of a gas mixture from one adsorption column to another can be correctly scheduled and gas product waste can be minimised. In addition, the high pressure applied in adsorption sets its own requirements to adsorption columns, which must meet the pressure vessel requirements. In turn, this causes additional costs related to the manufacture of a pressure vessel.

Due to the facts set forth above, small-sized scalable systems are not available on the market, but only large systems that are poorly applicable to different capacity needs. In the publication CN201470294 U, attempts have been made to solve the problem related to capacity by using smaller standard size adsorption columns connected in parallel in the same feed or discharge line. In this way, capacity can be increased or decreased by changing the number of adsorption columns connected in parallel. By using an adsorption column of one size, manufacturing costs of adsorption columns of different sizes are avoided. However, a problem related to this kind of construction is that specific operation valves and controls have been manufactured for each adsorption column separately in each size class, which makes the system expensive to implement.

Publication U.S. Pat. No. 5,549,736 proposing an adsorption column set meant for pressure swing adsorption is also known in the prior art. In this adsorption column set, custom-built adsorption columns are arranged in series and additional adsorption columns are provided alongside with these adsorption columns to increase capacity. However, such an adsorption column set is expensive to manufacture, since each adsorption column and additional adsorption column has its own operation valves and controls. In addition, the connection of additional adsorption columns requires a custom-built construction.

SUMMARY OF THE INVENTION

The object of the invention is to provide an adsorption column set that is more affordable to implement compared to prior art adsorption column sets for separating gases based on pressure swing adsorption.

The adsorption column set according to the invention is characterized by an adsorption column set for separating two or more gases of a gas mixture from each other using pressure swing adsorption, said adsorption column set including a first adsorption column set comprising at least two adsorption columns connected in series and including an adsorption medium for adsorbing the first gas by the action of pressure, and each adsorption column including a feed connection and a discharge connection. The adsorption column set additionally includes an optional number of additional adsorption column sets comprising an equal number of additional adsorption columns as there are adsorption columns in the first adsorption column set to form one or more additional adsorption columns alongside with the equivalent adsorption column of the first adsorption column set. Furthermore, the adsorption column set includes auxiliary equipment supported in the vicinity of the adsorption columns for feeding a gas mixture to the adsorption columns and for discharging separated gases according to pressure swing adsorption, comprising operation valves of each adsorption column for restricting the flow of the gas mixture and separated gases. The first adsorption column and each additional adsorption column include a connecting connection, and each parallel additional adsorption column is arranged to be connected with disconnectable connectors to the connecting connection of the previous one and arranged to jointly utilise the operation valves of the related adsorption column via the connecting connection.

With the connecting connection, additional adsorption columns can be connected in parallel to each adsorption column to provide additional volume, whereupon it is easy to increase the capacity of the adsorption column set. When using a connecting connection, additional operation valves are not needed for the additional adsorption column, since the additional adsorption column set is utilised with the operation valves of the first adsorption column set disposed in parallel therewith. Capacity can be increased in a considerably affordable way, since the filling and emptying of the additional adsorption column sets forming the additional capacity is performed with the same auxiliary equipment as for the first adsorption column set. Moreover, the use of essentially identical adsorption columns advantageously brings cost savings in that serial production of identical adsorption columns is more affordable than production of several columns of different sizes and, in addition, an approval from safety authorities is only required for one adsorption column for meeting the pressure vessel regulations. Generally, acquisition of safety authority approvals is expensive.

When speaking of an optional number of additional adsorption column sets, it is to be understood that there may also be only one additional adsorption column set.

Advantageously, each adsorption column and additional adsorption column includes two connecting connections. In this way, both discharging and feeding are provided with lines of their own and it is not necessary to use the same lines for them.

Advantageously, each adsorption column is arranged at a different pressure level using the auxiliary equipment. Thus, adsorption columns connected in series can be used according to the principle of pressure swing adsorption for efficient separation of gases from each other, arranged to different intervals.

Each additional adsorption column is advantageously directly connected to an adsorption column via the connecting connection, forming an unrestricted continuous volume with this adsorption column. In other words, there are no additional components between the adsorption column and the additional adsorption column other than the connecting connection, whereupon the common volume of the adsorption column and the additional adsorption column can be used by means of the operation valves of the adsorption column.

In other words, the operation valves of each adsorption column are arranged to feed a gas mixture into the additional adsorption column connected to the related adsorption column via the related adsorption column through the connecting connection.

Advantageously, each adsorption column only includes one feed line. Thus, the auxiliary equipment is very simple.

In this context, when speaking of a gas mixture, so-called crude gas is meant. It will also be understood by those skilled in the art that when speaking of a first gas and a second gas, these may actually mean a first gas mixture and a second gas mixture including one or more gases, which are separated from one or more gases adsorbing in the adsorption medium.

The volume of individual adsorption columns may range between 0.01 and 5 $m^3$, preferably between 0.05 and 2 $m^3$. Thus, by changing the number of adsorption columns of an adsorption column set, a considerable number of different total capacities can be achieved according to the user's need, which is not the case with prior art large adsorption columns exceeding 10 $m^3$.

Furthermore, the adsorption column set advantageously includes a frame for supporting the first adsorption column set in the place of use, the frame including connection means for connecting additional adsorption columns to the frame with a dedicated additional frame. The frame enables easy capacity expansion of the adsorption column set, since additional adsorption columns can be directly connected to the frame of the original adsorption columns using their own additional frames. In this way, adsorption columns providing additional capacity can be pre-installed in the additional frame already in the factory, and the installation in the place of use alongside with the original adsorption columns takes place in a considerably quick and simple way.

Advantageously, the frame comprises anchoring members for fastening the additional frame in order to increase capacity. With the anchoring members, the frame and the additional frame can be locked together to form a stable entity, whereupon the connections of the additional adsorption columns will automatically align with the connecting connections of the original adsorption columns without separate alignment.

The connecting connection is preferably a T-branch. A T-branch is affordable to implement and divides the flow relatively uniformly to both the original adsorption column and the additional adsorption column.

The auxiliary equipment can also be adapted for using the additional adsorption columns. Thus, the auxiliary equipment can also be directly used as such without any modifications for the adsorption column set of expanded capacity.

The auxiliary equipment is advantageously dimensioned in such a way that the capacity of the auxiliary equipment corresponds at least to the aggregated requirement of the first adsorption column set and 1-10 additional adsorption column set(s), preferably 2-4 additional adsorption column sets, connected thereto. For example, if four adsorption columns have been connected to the frame, the capacity of the auxiliary equipment or at least that of the piping has been dimensioned taking into account the additional adsorption column to be connected to each adsorption column, i.e. the capacity has been dimensioned at least for eight adsorption columns. This enables, at the minimum, doubling the capacity without any modifications to the auxiliary equipment.

The auxiliary equipment may include a feed line comprising a feed connection for feeding a gas mixture to adsorption columns and a discharge line comprising a discharge connection connected to the adsorption columns for discharging gases from the adsorption columns.

The auxiliary equipment can additionally include pressurisation means connected to the feed line for pressurising a gas mixture while feeding it to at least one adsorption column, vacuum means for creating a vacuum in the adsorption column to provide desorption of gas adsorbed in the adsorption medium, and intermediate feed lines between the adsorption columns for increasing the pressure of adsorption columns and for stagewise regeneration.

Furthermore, the auxiliary equipment may include a valve system comprising the operation valves of each adsorption column, namely feed valves and discharge valves, as well as intermediate feed valves for restricting the feed and discharge flows of the adsorption columns, and a control system for controlling the valve system in a staged manner to feed a gas mixture stagewise into each adsorption column at a different pressure level utilising the pressure of the previous adsorption columns.

Advantageously, the adsorption column set is arranged to separate carbon dioxide from methane.

Advantageously, the detachable connecting connectors can be a straight pipe equipped with flanged connections with bolt holes for attaching adsorption columns using bolts and nuts or similar.

Advantageously, each additional adsorption column also includes a feed connection and a discharge connection, one of which or both including a connecting connection for connecting additional adsorption columns successively in parallel with each adsorption column for increasing capacity. Thus, several additional adsorption columns can be successively connected in parallel to the same adsorption column to enable a capacity increase.

Advantageously, the adsorption column set includes an optional detachable closure for each connecting connection of the last additional adsorption column set for plugging the connecting connection. With the closure, the connecting connection of the last additional adsorption column set or, alternatively, that of the first adsorption column set can be plugged, if a successive additional adsorption column set is not connected in parallel after this set.

Advantageously, each connecting connection is equipped with a flanged connection. A flange connection is very simple to connect using simple unit parts, such as bolts and nuts, in which case the adsorption columns and additional adsorption columns can be very simple. In addition, adsorption columns and additional adsorption columns connected with flanged connections are also simple to dismount.

With an adsorption column set according to the invention, it is possible to variably implement several pieces of equipment with different capacities for separating gases from each other using pressure swing adsorption. The use of relatively small and essentially identical adsorption columns enables a stepwise capacity expansion according to the need at a notably low cost. If the investment cost of the original adsorption column set is €500,000, the cost for doubling the capacity may be as low as €100,000. This is due to the fact that it is not necessary to arrange dedicated auxiliary equipment for the additional adsorption columns, but it is possible to utilise the auxiliary equipment of the original adsorption column set for the additional adsorption columns as well.

Advantages of an adsorption column set according to the invention include, for example, relating to the separation of carbon dioxide and methane, highly efficient separation of carbon dioxide and purity of the gas product, low energy consumption, the possibility to implement production plants utilising a compact adsorption column set, and the possibility to implement the plants on a small scale as well.

BRIEF DESCRIPTION OF THE DRAWINGS

The invention is described below in detail by making reference to the appended drawings that illustrate some of the embodiments of the invention, in which.

DETAILED DESCRIPTION OF THE INVENTION

Figure 1:
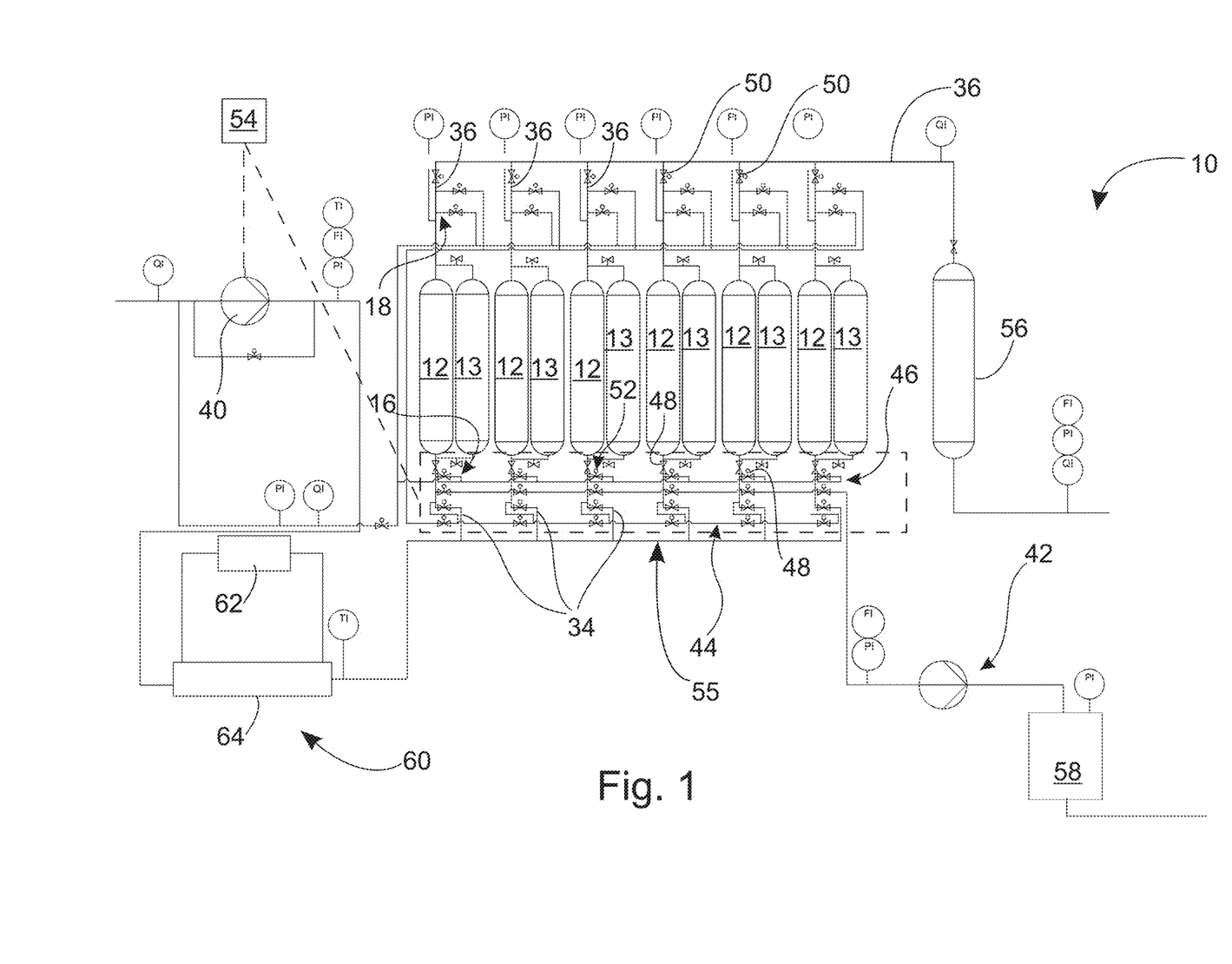
FIG. 1 is a basic process flow diagram of an adsorption column set according to the invention.
Figure 2A:
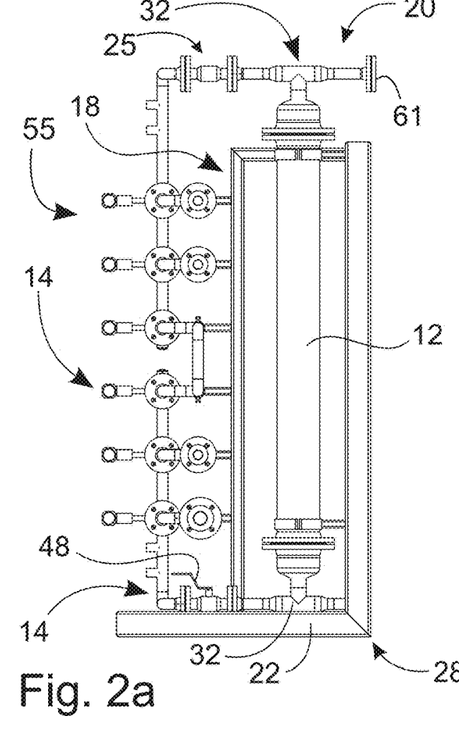
FIG. 2a is a lateral view of an adsorption column set according to the invention without additional capacity.
Figure 2B:
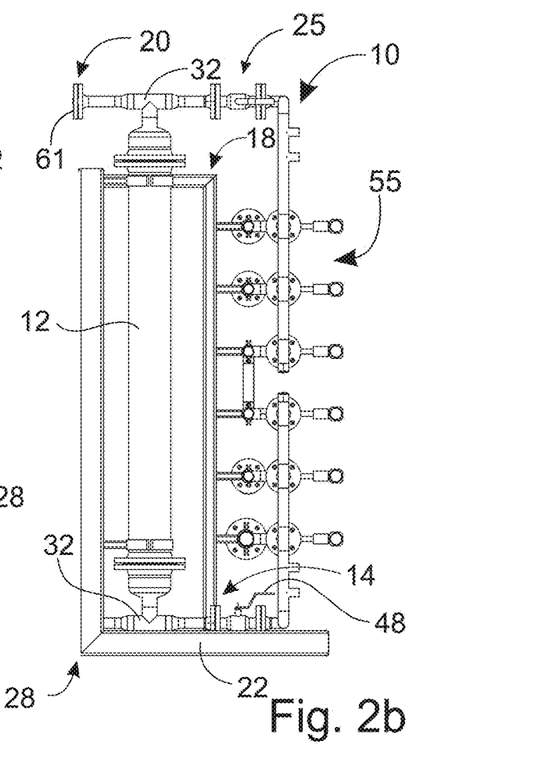
FIG. 2b is a lateral view from the other side of an adsorption column set according to the invention without additional capacity.
Figure 2C:
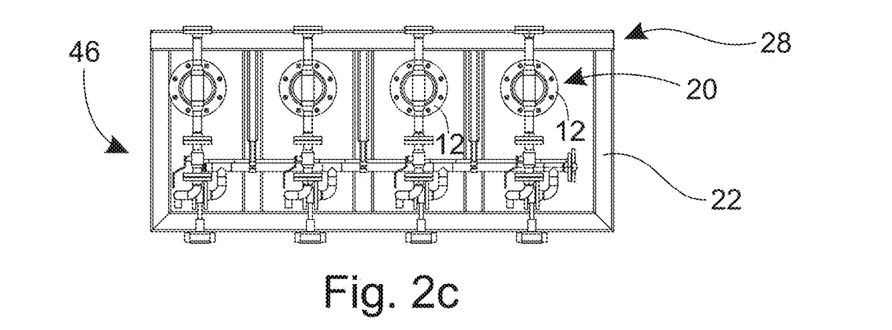
FIG. 2c is a top view of an adsorption column set according to the invention without additional capacity.

FIG. 1 is a basic view of an embodiment of an adsorption column set according to the invention. According to FIG. 1, the adsorption column set 10 according to the invention includes a first adsorption column set comprising at least two adsorption columns 12 connected in series and comprising an adsorption medium for adsorbing a first gas by the action of pressure. According to the principle of pressure swing adsorption, one of the adsorption columns 12 is pressurised so that one of the gases to be separated is adsorbed in the adsorption medium. In turn, the second adsorption column 12 is within such an interval that it is pressurised by venting the previous adsorption column. The rest of the adsorption columns 12 connected in series may be intermediate stages between these two, wherein the pressure level is raised or lowered. In the embodiment of FIG. 1, the number of adsorption columns 12 in the first adsorption column set is six. According to the invention, adsorption columns 12 in the adsorption column set 10 are advantageously essentially identical with each other, and the feed connections 16 and/or the discharge connections 18 of each adsorption column 12 include a connecting connection 20 shown in FIGS. 2a-3e enabling the connection of an additional adsorption column set or sets, which include(s) an equal number of additional adsorption columns 13, together with the adsorption columns 12, for increasing the capacity of the first adsorption column set. Each additional adsorption column is connected in parallel with the adsorption column in such a way that the adsorption column 12 and the additional adsorption column, advantageously essentially identical with the first, form a continuous volume. When speaking of additional adsorption columns 13 that are physically connected to the same row, the collective term "additional adsorption column set" can also be used.

According to FIGS. 2a-3e, the adsorption column set 10 according to the invention includes auxiliary equipment 14 supported in the vicinity of the adsorption columns 12 of the first adsorption column set for feeding the gases to be separated into the adsorption columns 12 and venting them from these according to pressure swing adsorption, comprising operation valves 55 of each adsorption column 12 for restricting the flow of the gas mixture and separated gases. With the auxiliary equipment 14, adsorption columns are cyclically pressurised in series according to FIG. 4. Cyclic pressurisation of adsorption columns will be discussed later. Each adsorption column 12 as well as, advantageously, each additional adsorption column 13 includes a feed connection 16 and a discharge connection 18 shown in FIG. 1.

More precisely, the auxiliary equipment 14 advantageously includes a feed line 34 connected to the feed connection 16 of the adsorption column 12 for feeding the gas mixture to each adsorption column 12, and a discharge line 36 connected to the discharge connection 18 of the adsorption column 12 for discharging one gas from the adsorption column 12 in a staged manner. Advantageously, at least two discharge lines 36 are provided per each adsorption column. With the feed line, the gas mixture to be separated is brought to the adsorption columns from a process that produces a gas mixture, for example. For example, the production process of the gas mixture may be anaerobic fermentation that produces biogas, which includes methane, carbon dioxide and sulphur compounds. Sulphur compounds must be removed already before using the adsorption columns so that the gases remaining to be separated with adsorption columns consist of carbon dioxide and methane. Advantageously, several adsorption columns are connected to one feed line, as well as to one discharge line. In this context, it will be understood by those skilled in the art that the method according to the invention can also be used for other gas mixtures, such as for air, for separating oxygen and nitrogen.

Furthermore, the auxiliary equipment 14 advantageously includes pressurisation means 40 connected to the feed line 34 for pressurising the gas mixture while feeding it to at least one adsorption column 12, vacuum means 42 connected to a second discharge line 36 for creating a vacuum in the adsorption column 12 in order to provide desorption of the gas adsorbed in the adsorption medium after unadsorbed gas has been discharged from the adsorption column 12, and intermediate feed lines 44 between the adsorption columns 12 for increasing and decreasing the pressure of the adsorption columns 12 utilising the pressure levels of the adsorption columns 12 connected in series in a staged manner. With the pressurisation means 40, the pressure in each adsorption column 12 and in the additional adsorption column 13 connected in parallel therewith, respectively related to the first adsorption column set and the additional adsorption column set, can be increased to such a level that one of the gases, in this case carbon dioxide, adsorbs in the adsorption medium while methane remains free in the adsorption column 12. The pressurisation means advantageously consist of a pressure booster pump, or a screw pump, for example, with which the gas is pressurised to a pressure level suitable for the purpose. The pressure level may be 10 bar and the capacity of the screw pump may range between 10 and 1000 m$^3$/h, for example. After the saturation of the carbon molecular sieve, methane present in the adsorption column is led further to pressurise the following adsorption columns, and once the pressure has decreased to a level of 0 barg, gas adsorbed in the adsorption medium is desorbed utilising a vacuum created with the vacuum means 42. The vacuum means 42 advantageously consist of vacuum pumps, which may be piston pumps with a capacity of about 10-1000 m$^3$/h, for example. For reducing pressure, to fill the cyclically fed adsorption columns, the pressure of the adsorption column filled earlier with the intermediate feed lines 44 is used, when starting to decrease the pressure of this adsorption column.

The auxiliary equipment 14 advantageously includes a valve system comprising the operation valves 55 of each adsorption column, i.e. feed valves and discharge valves, as well as intermediate feed valves for restricting the feed and discharge flows of the adsorption columns 12, as well as a control system 54 for controlling the valve system in a staged manner to feed a gas mixture stagewise into each adsorption column 12 at a different pressure level utilising the pressure of the previous adsorption columns 12. The valve system 46 and the feed valves 48 are shown in FIGS. 2a-3e. The valve system is advantageously controlled with the control system 54 in a very simple way, in time control; that is, the entire valve system operates simultaneously at selected intervals. Advantageously, the number of discharge valves 50 shown in FIG. 1 is at least two for each adsorption column, since separated gases are discharged into different lines.

In this context, when reference is made to the feeding of a gas mixture to an adsorption column, the use of auxiliary equipment for the filling and emptying of the adsorption column, and the discharging of separated gases from the adsorption columns, it will be understood by those skilled in the art that, at the same time, corresponding operations of the additional adsorption column connected in parallel in the vicinity of the related adsorption column are meant, these operations taking place automatically at the same time, since the adsorption column and the additional adsorption column form a continuous volume.

In a biogas processing plant, adsorption columns operate cyclically in stages in the adsorption column set in different stages, which include pressurisation, gas feeding/adsorption and regeneration. With the PSA technology, a methane content of 96-99% is generally achieved for the gas product. With the PSA technology, it is possible to efficiently separate carbon dioxide and partly also nitrogen and oxygen, if contained in the crude gas, from the gas mixture.

During the pressurisation, the first adsorption column 12 is first pressurised to a pressure of 4-12 bar, for example, by feeding a gas mixture pressurised with the pressurisation means 40 along the feed line 34 through the feed valve to the adsorption column 12 while the discharge valves 50 are closed. Before feeding to the first adsorption column 12, the gas mixture to be fed has been pressurised to a pressure of 6-12 bar with the pressurisation means 40, whereupon the temperature of the gas mixture has risen to about 40-70° C. However, to reduce the gas volume, the gas mixture has advantageously been cooled down to about 10-30° C. with cooling means 60 before feeding it to the first adsorption column 12. The cooling means 60 advantageously include a refrigerating machine 62 and a gas condenser 64, according to FIG. 1. When the pressure increases, one of the gases to be separated adsorbs in the adsorption medium contained in the adsorption column 12. When reaching a pressure level of 9-bar, the feed valve 48 can be closed and one of the discharge valves 50 can be opened to allow unadsorbed gas at a concentration of almost 100% to flow to the discharge line leading to the biogas container 56. The production of biomethane can be 200-500 Nm$^3$/h, for example. The concentration of unadsorbed gas flowing to the discharge line 36 is monitored, and when the concentration goes down to e.g. 92-94%, in the case of biomethane, by way of example, the discharge valve 50 is closed after 4-7 minutes, for example. At this stage, the pressure of the adsorption column is about 8-11 bar.

After this, the intermediate feed valve 52 of the intermediate feed line 44 is opened and the feeding of the gas mixture contained in the adsorption column 12 into the following adsorption column 12 in the series of the PSA process is started and will be continued, until the pressure in the adsorption column 12 to be emptied has decreased to a level of about 5-8.5 bar. This stage may last approximately 0.5-3.0 min. After this stage, the intermediate feed valve is closed and the second intermediate valve is opened, which, in turn, leads the gas mixture to the third adsorption column 12, until the pressure in the first adsorption column 12 has decreased to a level of 2.5-4.5 bar during 0.5-3.0 minutes. Once the pressure has decreased, the second intermediate valve 52 is closed and the third intermediate valve 52 is opened to lead the rest of the gas mixture to the fourth adsorption column 12, which also takes place within 0.5-3.0 minutes, until the pressure level of the first adsorption column 12 is 0 bar. At this point, the third intermediate valve 52 is closed.

Once the pressure has decreased to a level at which the vessel no longer contains mainly carbon dioxide, the discharge valve 50 of the second discharge line 36 of the first adsorption column 12 is opened and a pressure of about −0.5-(−)2.5 bar is aspirated in the first adsorption column 12 with the vacuum means 42. Thus, gas adsorbed in the adsorption medium desorbs from the adsorption medium and is sucked in the second discharge line 36 while the adsorption medium is regenerated, this step lasting about 0.5-2.5 minutes. After this, a new filling cycle can be started, wherein the first adsorption column 12 is again pressurised utilising the pressure of the other adsorption columns 12.

The pressure levels of the adsorption vessels in different stages can be utilised in the pressurisation of adsorption columns according to the PSA process. In the adsorption column set according to the invention, the volume of an individual adsorption column is expanded by connecting in parallel additional adsorption columns to form a continuous volume.

Figure 3A:
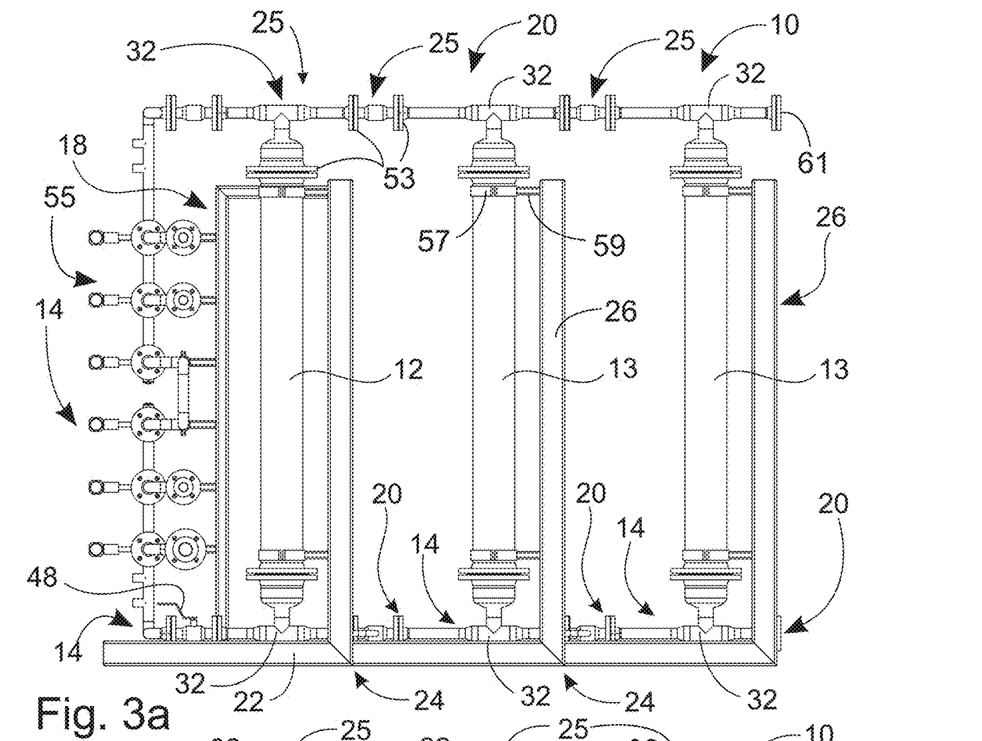
FIG. 3a is a lateral view of an adsorption column set according to the invention with additional capacity.
Figure 3B:
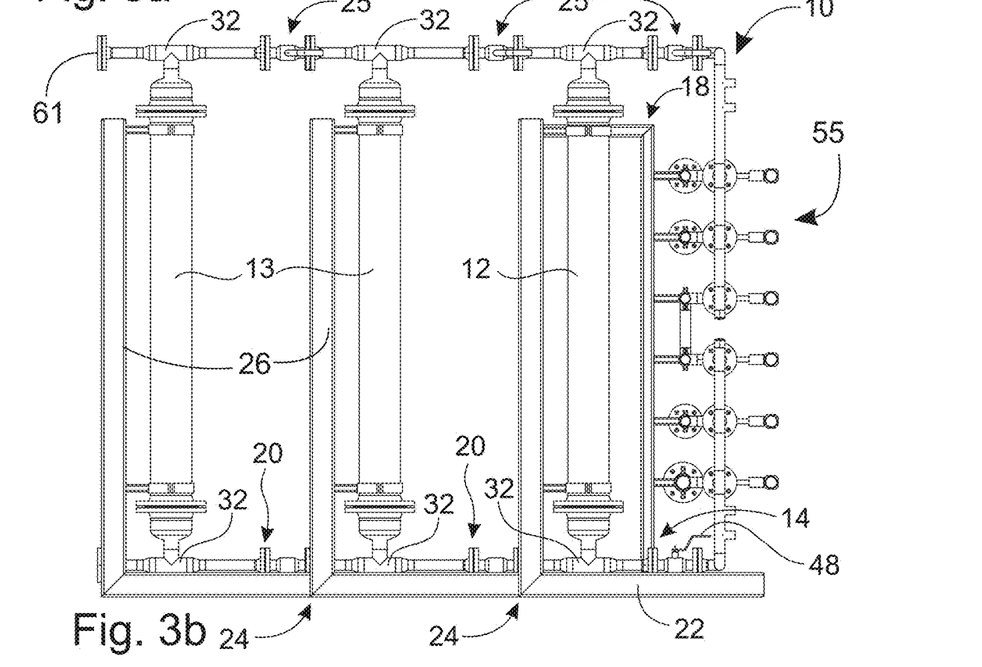
FIG. 3b is a lateral view from the other side of an adsorption column set according to the invention with additional capacity.
Figure 3C:
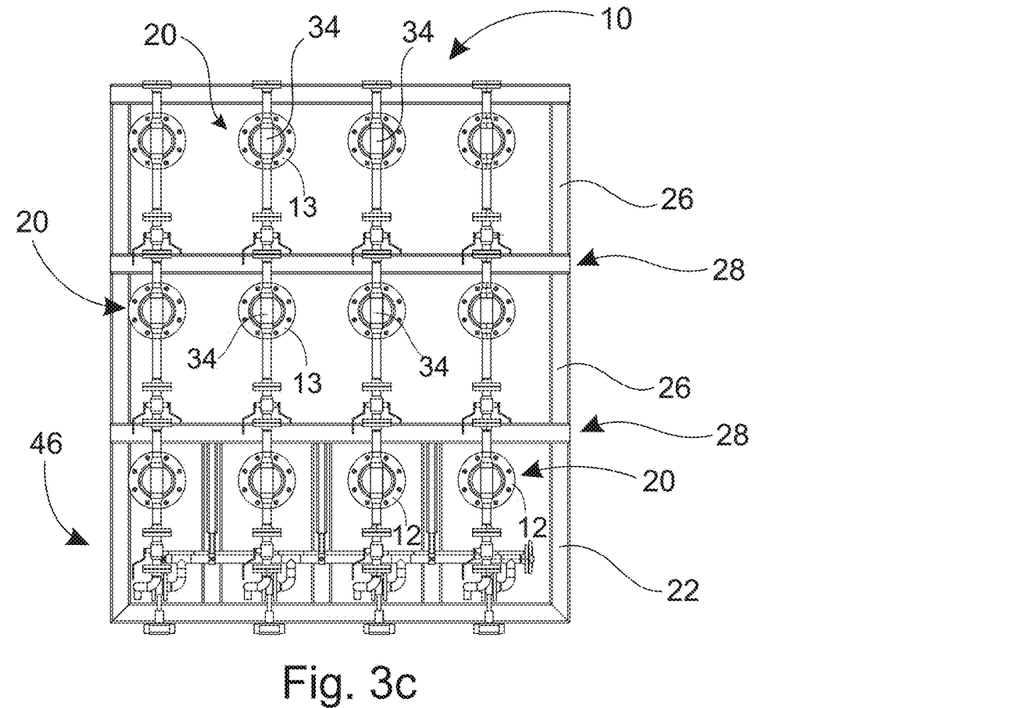
FIG. 3c is a top view of an adsorption column set according to the invention with additional capacity.
Figure 3D:
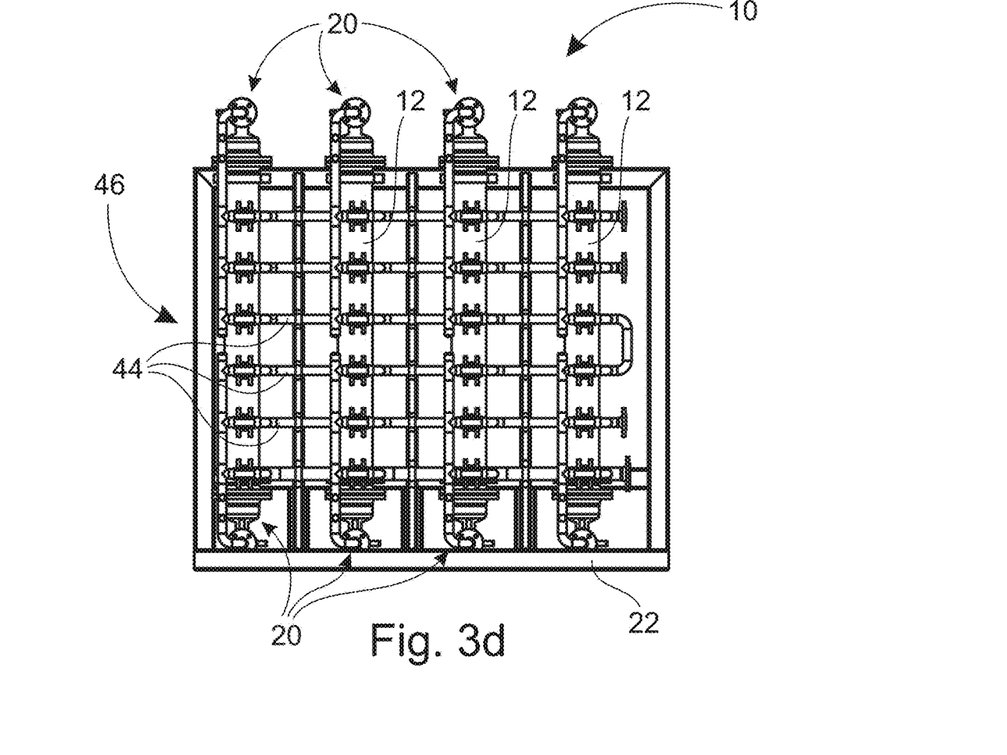
FIG. 3d is a front view of an adsorption column set according to the invention with additional capacity.
Figure 3E:
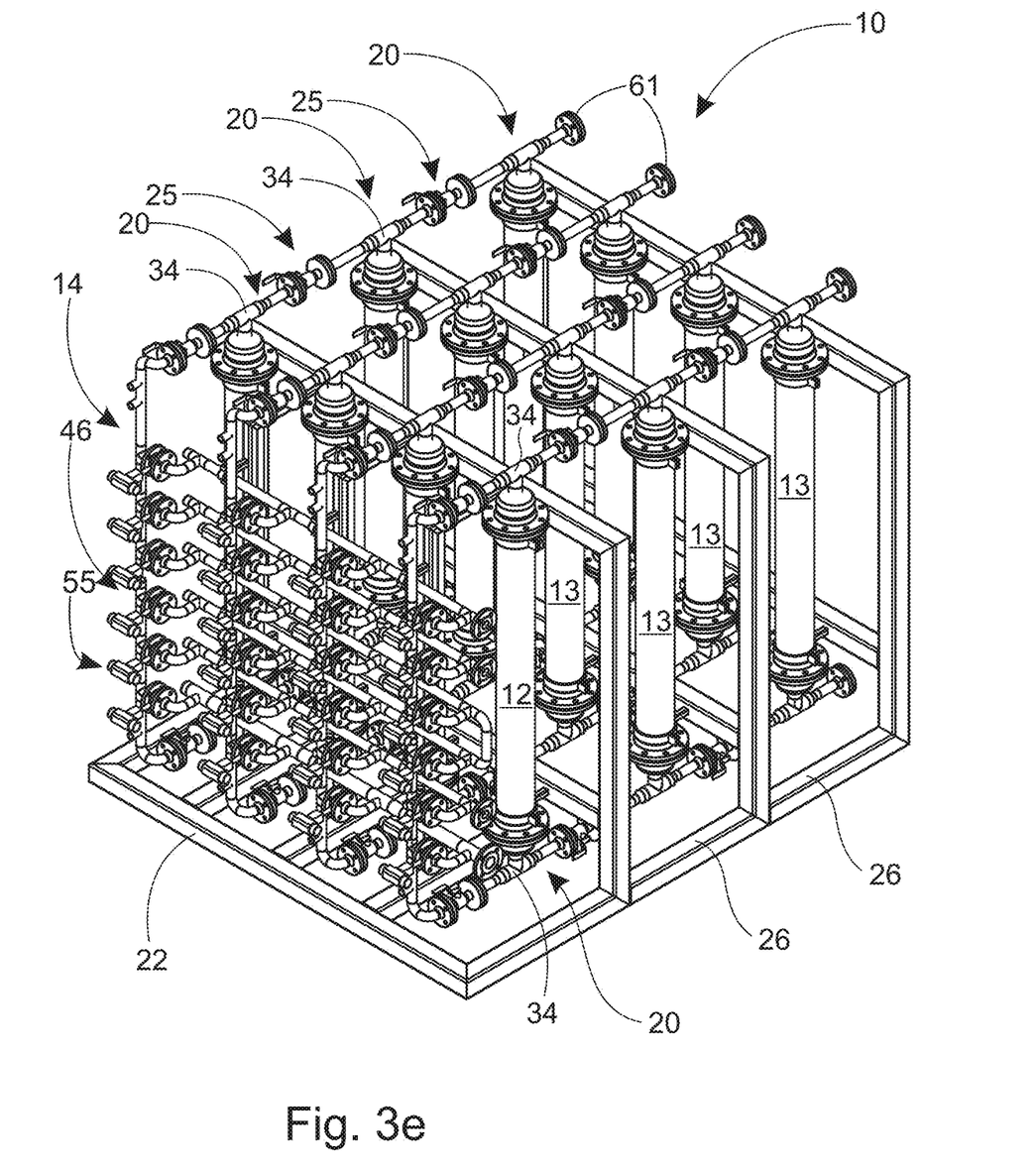
FIG. 3e is an axonometric view of an adsorption column set according to the invention with additional capacity.
Figure 4:
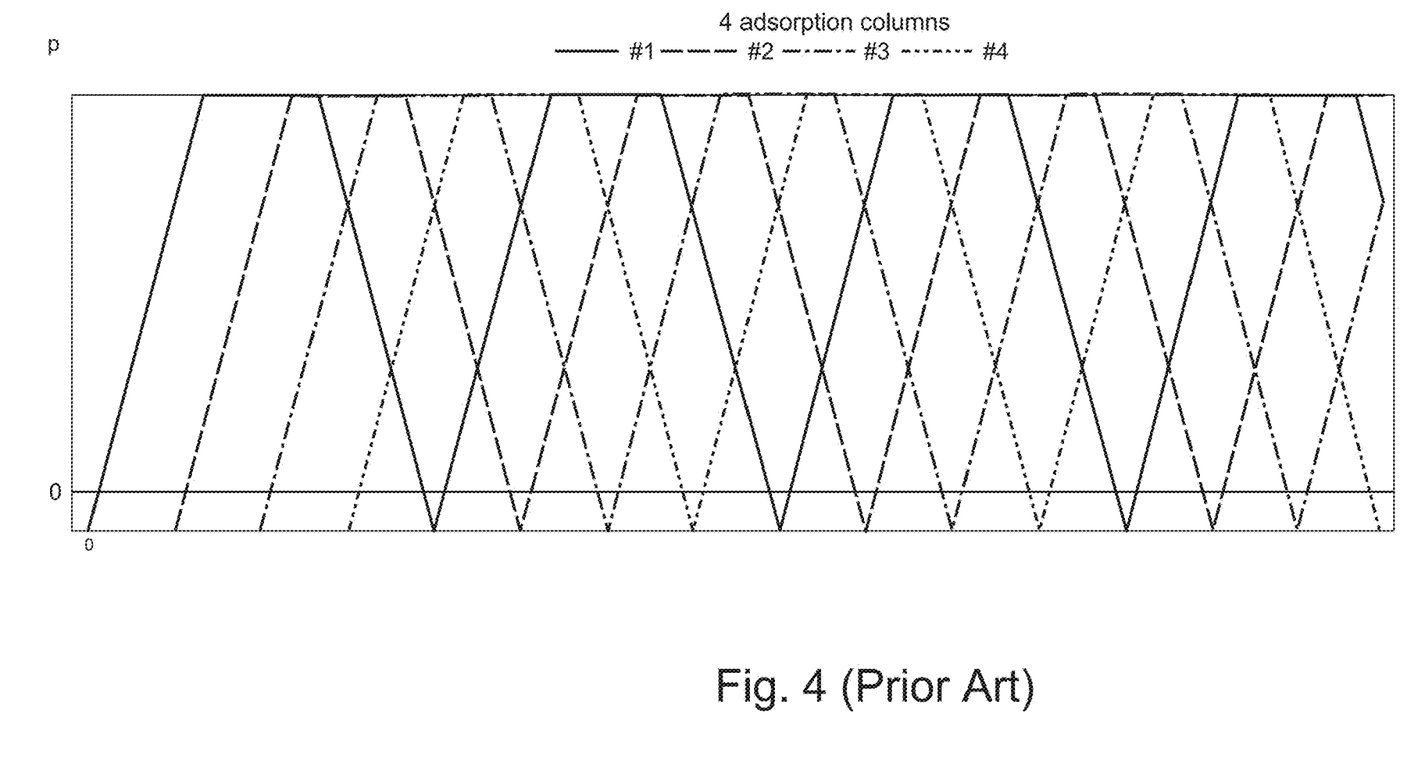
FIG. 4 is a prior art pressurisation diagram of adsorption columns in pressure swing adsorption.

FIGS. 3a-3c show an axonometric view of an embodiment of the adsorption column set 10 according to the invention, including four adsorption columns 12 in different stages of the PSA process and two additional adsorption columns 13 connected in parallel for each adsorption column 12, for increasing capacity. According to FIGS. 2a-2c, the adsorption column set 10 may at its simplest consist of four adsorption columns 12 connected in series, fastened to the frame 22 and connected to the auxiliary equipment 14. The gas mixture to be separated can be fed into and discharged from the adsorption columns 12 with the auxiliary equipment 14. To provide additional capacity, a second and a third additional adsorption column set comprising additional adsorption columns 13, which are connected to additional frames 26 with connection means 24, are connected in parallel to these adsorption columns 12 equipped with auxiliary equipment 14, according to FIGS. 3a-3c. In turn, the additional frames 26 are connected to the frame 22 with anchoring members 28. For example, the anchoring members 28 may consist of preformed perforations and bolts or similar locking means, with which the frame 22 and the additional frames 26 can be locked to each other. Advantageously, the additional adsorption columns 13 of the additional adsorption column sets are identical with the adsorption columns 12 fastened to the frame 22 of the adsorption column set 10, excluding the auxiliary equipment 14, which is only provided in the adsorption columns 12 fastened to the frame 22.

With the additional frames 26, the additional adsorption columns 13 to be connected after the adsorption columns 12 located in the frame 22 are each connected in parallel to the adsorption column 12 aligned with it to form a continuous volume, using connecting connections 20. In other words, according to FIGS. 2a-3c, for example, the adsorption column 12 on the right hand side of the one fastened to the frame 22 is connected to the additional adsorption columns 13 located on the right hand side of the first and second additional adsorption column set. Advantageously, a connecting connection 20 is provided in each adsorption column 12 and additional adsorption column 13 in connection with both the feed line 34 and the discharge line 36 in order to avoid additional flow resistance. Basically, the adsorption column set can also be implemented in such a way that each adsorption column only includes one connecting connection, through which both filling and discharging take place.

At its simplest, the connecting connection 20 is a T-branch 32 of a pipe, which enables continuation of the feed line 34 to the adsorption column 12 located in parallel therewith. If an adsorption column is not connected to the T-branch to provide additional capacity, the other end of the T-branch will be plugged with a flange or equivalent. Alternatively, instead of the T-branch 32, it is possible to use any branch or connection, which is connected to the feed line 34 after the feed valve 48 in such a way that it enables the use of parallel adsorption columns as a continuous volume.

Figure 5:
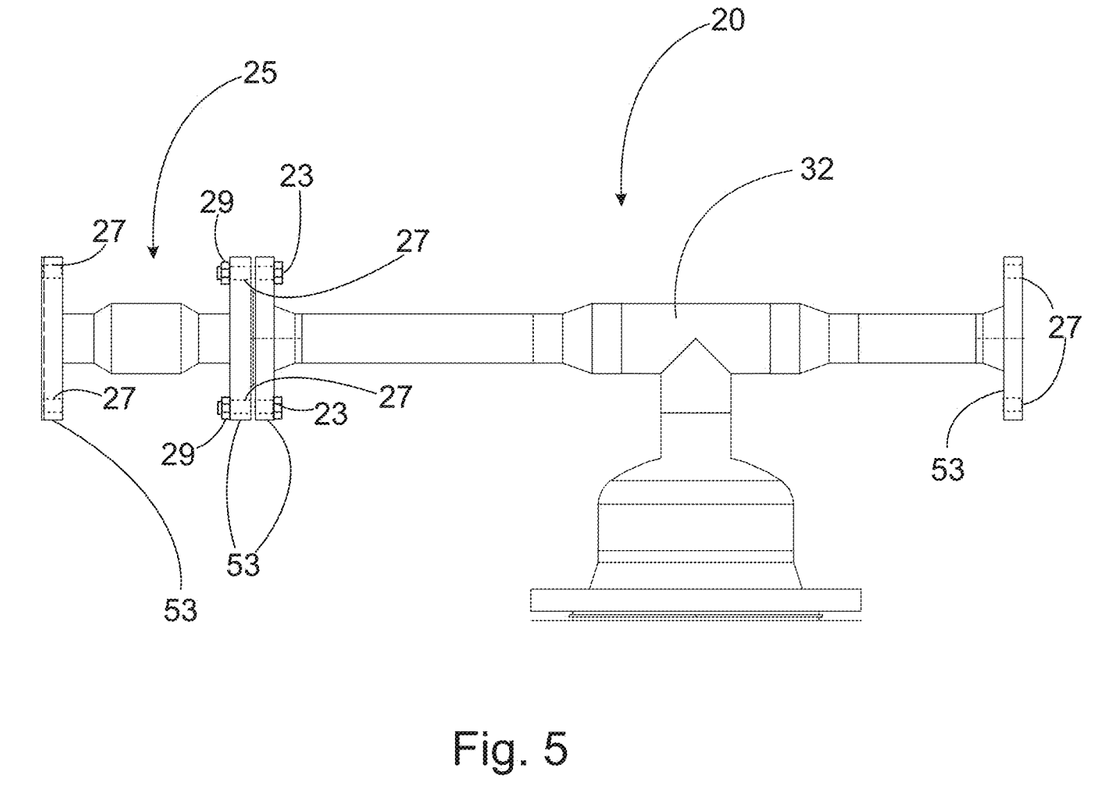
FIG. 5 is a lateral view of the connecting connection according to an embodiment.

The T-branch 32 advantageously includes flanged connections according to FIG. 3a, via which it is possible to connect additional adsorption columns 13 to each other. In turn, flanged connections can be sealed off with seals, and the connections are locked by using detachable connecting connectors 25. The connecting connectors 25 can be, for example, short straight pipes equipped with flanged connections 53 for connecting the adsorption columns to each other using bolts 23 fed through bolt holes 27 of the flanged connections 53 and nuts 29 as shown in FIG. 5. Bands 57 fastened to the frame 22 by means of arms 59 can advantageously be used to fasten the adsorption columns 12 to the frame 22. Correspondingly, bands 57 can also be used to fasten the additional adsorption columns 13 to the additional frame 26.

The auxiliary equipment 14 is advantageously dimensioned in such a way that it enables the addition of additional capacity in the form of additional adsorption columns. Advantageously, the auxiliary equipment is dimensioned according to a multiple of the adsorption columns connected to the frame.

The frame 22 used in the adsorption column set according to the invention may be formed of a steel profile, an L-form construction viewed from the side, which forms a closed circle. For example, the frame can be bolted to the floor in the place of use. Such a construction enables an advanced manufacture of the adsorption column set in the factory by the manufacturer, whereupon the installation itself in the place of use is very quick and simple. Advantageously, additional frames 26 used in the adsorption column set are identical with the frames 22, allowing implementation of the entire adsorption column set using a single frame design.

When using an adsorption column set according to the invention, the pressurisation and the various stages of the adsorption columns are controlled with a separate control unit. At its simplest, the control unit opens and closes the operation valves of the valve system simultaneously in series according to the clock. Adsorption columns may operate at intervals of 15 minutes, which start exactly at intervals of one minute.

Unadsorbed gas, which is advantageously biomethane, removed from adsorption columns can be discharged into a separate biomethane tank 56 according to FIG. 1. From the biomethane tank 56, biomethane can be delivered, after continuously operating $CH_4$, $CO_2$, $N_2$, $H_2S$, O and caloric value measurements, to a natural gas network or tanked into vehicles, after pressurisation. Advantageously, the gas to be removed, such as carbon dioxide, is also provided with a tank 58, from which it can be delivered to further use.

The adsorption medium used in the adsorption columns may be an adsorption medium known in the prior art, preferably adsorption filler pieces, in the small gaps of which the other or the rest of the gases are adsorbed.

The adsorption columns used in the adsorption column set according to the invention may be prior art cylindrical vessels, which have been manufactured in accordance with the pressure vessel regulations.

The invention claimed is:

1. An adsorption column set for separating two or more gases of a gas mixture from each other using pressure swing adsorption, the adsorption column set including:
   a first adsorption column set comprising at least two adsorption columns and including an adsorption medium to adsorb a first gas by action of pressure, and each adsorption column including a feed connection, a discharge connection and a first connecting connection, wherein the at least two adsorption columns of said first adsorption column set are connected in series,
   a number of additional adsorption column sets comprising an equal number of additional adsorption columns as there are adsorption columns in the first adsorption column set forming one or more additional adsorption columns in parallel with a respective one of the adsorption columns of the first adsorption column set, each additional column including a second connecting connection,
   disconnectable connecting connectors connecting each parallel additional adsorption column to the adsorption column of said first adsorption column set using said first and second connecting connections, wherein each first adsorption column and at least one additional adsorption column connected in parallel form an unrestricted continuous volume for gas,
   auxiliary equipment supported in a vicinity of the adsorption columns feeding a gas mixture to the adsorption columns and discharging separated gases according to pressure swing adsorption, comprising operation valves of each first adsorption column restricting flow of the gas mixture and separated gases jointly for the first adsorption column and additional adsorption columns forming the unrestricted continuous volume,
   wherein each first adsorption column is arranged at a different pressure level using the auxiliary equipment.

2. An adsorption column set according to claim 1, wherein the volume of each adsorption column is 0.01-5 m3.

3. An adsorption column set according to claim 1, wherein the volume of each adsorption column is 0.05 and 2 m3.

4. An adsorption column set according to claim 1, said adsorption column set further including a frame for supporting the first adsorption column set in a place of use, the frame including connection means connecting the additional adsorption columns to the frame with a dedicated additional frame.

5. An adsorption column set according to claim 4, wherein the frame comprises anchoring members connecting the dedicated additional frame to the frame for increasing capacity.

6. An adsorption column set according to claim 1, wherein the connecting connections are T-branches.

7. An adsorption column set according to claim 1, wherein said auxiliary equipment is also adapted for operating the additional adsorption columns.

8. An adsorption column set according to claim 1, wherein the dimensions of the auxiliary equipment are such that capacity of the auxiliary equipment corresponds to the aggregated need of the adsorption column and 1-10 additional adsorption columns connected thereto.

9. An adsorption column set according to claim 1, wherein the dimensions of the auxiliary equipment are such that capacity of the auxiliary equipment corresponds to the aggregated need of the adsorption column and 2-4 additional adsorption columns connected thereto.

10. An adsorption column set according to claim 1, wherein the auxiliary equipment includes for each adsorption column of the first adsorption column set
    a feed line connected to the feed connection feeding a gas mixture to the adsorption columns,
    a discharge line connected to said discharge connection discharging gases from the adsorption columns.

11. An adsorption column set according to claim 10, wherein the auxiliary equipment includes
    pressurisation means connected to the feed line pressurising the gas mixture while feeding the gas mixture to at least one adsorption column,
    vacuum means arranged in the discharge line creating a vacuum in the adsorption column providing desorption of gas adsorbed in adsorption medium,
    intermediate feed lines between adsorption columns increasing and decreasing the pressure of the adsorption columns in a staged manner.

12. An adsorption column set according to claim 1, wherein the auxiliary equipment includes
    a valve system comprising the operation valves of each adsorption column, namely a feed valve and a discharge valve, as well as an intermediate feed valve restricting the feed and discharge flows of the adsorption columns,
    a control system controlling the valve system in a staged manner, arranged to feed the gas mixture in a staged manner to each adsorption column at a different pressure level utilising the pressure of the previous adsorption columns.

13. An adsorption column set according to claim 1, wherein each additional adsorption column is directly connected to the adsorption column via the connecting connection and second connecting connection forming the unrestricted continuous volume relative to each other.

14. An adsorption column set according to claim 1, wherein the operation valves of each adsorption column feed a gas mixture to the additional adsorption column connected to the related adsorption column via the feed connection of the related adsorption column.

15. An adsorption column set according to claim 1, wherein each additional adsorption column also includes a feed connection and a discharge connection, the feed connection or the discharge connection or both including the connecting connection connecting said additional adsorption columns successively in parallel with each adsorption column for increasing capacity.

16. An adsorption column set according to claim 1, further including a detachable closure for each connecting connection of a last additional adsorption column set for plugging the connecting connection.

17. An adsorption column set according to claim 1, wherein each connecting connection comprises a flanged connection.

18. An adsorption column set according to claim 11, wherein said intermediate line is connected between the discharge line of one adsorption column of the first adsorption column set and the feed line of another adsorption column of the first adsorption column set that is in a lower pressure level.

* * * * *